United States Patent
Jorgovanovic et al.

(10) Patent No.: US 9,742,481 B1
(45) Date of Patent: Aug. 22, 2017

(54) ANTENNA SWITCHING

(71) Applicant: Amazon Technologies, Inc., Seattle, WA (US)

(72) Inventors: Milos Jorgovanovic, Santa Clara, CA (US); Pratik Kalpesh Patel, Sunnyvale, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/267,878

(22) Filed: Sep. 16, 2016

(51) Int. Cl.
H04B 7/00 (2006.01)
H04B 7/08 (2006.01)
H01Q 1/24 (2006.01)
H04L 12/26 (2006.01)

(52) U.S. Cl.
CPC ............. H04B 7/082 (2013.01); H01Q 1/243 (2013.01); H04L 43/16 (2013.01); H04B 7/0814 (2013.01); H04B 7/0817 (2013.01)

(58) Field of Classification Search
CPC .. H04B 7/0802; H04B 7/0814; H04B 7/0817; H04B 7/082; H04B 7/0822; H04B 7/0825; H04B 17/26
USPC ............................................ 455/277.1, 277.2
See application file for complete search history.

(56) References Cited

U.S. PATENT DOCUMENTS

| | | | | |
|---|---|---|---|---|
| 5,168,574 A * | 12/1992 | Gordon | ................ | H04B 7/1555 455/15 |
| 5,396,645 A * | 3/1995 | Huff | ....................... | H04B 7/082 455/134 |
| 5,481,571 A * | 1/1996 | Balachandran | ...... | H04B 7/0814 375/347 |
| 5,499,397 A * | 3/1996 | Wadin | .................. | H04B 7/0814 375/347 |
| 5,991,613 A * | 11/1999 | Euscher | ............... | H04B 7/0814 455/275 |
| 6,023,615 A * | 2/2000 | Bruckert | ................ | H04B 7/082 348/14.08 |
| 6,118,773 A * | 9/2000 | Todd | ..................... | H04B 7/0808 370/334 |
| 6,483,884 B1 * | 11/2002 | Shen | ..................... | H04B 7/0811 375/347 |
| 8,340,614 B2 * | 12/2012 | Rosener | .................. | G01S 11/06 455/226.2 |
| 8,897,731 B2 * | 11/2014 | Mujtaba | ............... | H04B 7/0817 455/132 |
| 8,934,852 B2 * | 1/2015 | Yan | ...................... | H04B 7/0608 343/876 |
| 2006/0067442 A1 * | 3/2006 | Tanaka | ................. | H04B 7/0811 375/347 |

(Continued)

*Primary Examiner* — Duc M Nguyen
(74) *Attorney, Agent, or Firm* — Pierce Atwood LLP

(57) ABSTRACT

A device that dynamically selects between multiple antennas to provide a best antenna selection for a wireless link between the device and an access point. The device may have a switch connected to multiple antennas and may instruct the switch to select from the antennas in order to improve a signal quality of the wireless link regardless of orientation of the device or obstructions in proximity to the device. For example, the device may determine a first signal strength associated with the wireless link using a first antenna and a second signal strength associated with the wireless link using a second antenna and may select the first antenna or the second antenna based on the first signal strength and the second signal strength.

20 Claims, 11 Drawing Sheets

(56) References Cited

U.S. PATENT DOCUMENTS

| | | | | |
|---|---|---|---|---|
| 2008/0240280 | A1* | 10/2008 | Li | H04B 7/0608 |
| | | | | 375/267 |
| 2013/0307727 | A1* | 11/2013 | He | H04B 7/0608 |
| | | | | 342/374 |
| 2013/0308608 | A1* | 11/2013 | Hu | H04B 7/0608 |
| | | | | 370/334 |
| 2013/0310109 | A1* | 11/2013 | Filipovic | H04B 7/0608 |
| | | | | 455/553.1 |
| 2015/0179043 | A1* | 6/2015 | Gude | H04B 17/318 |
| | | | | 455/226.2 |

* cited by examiner

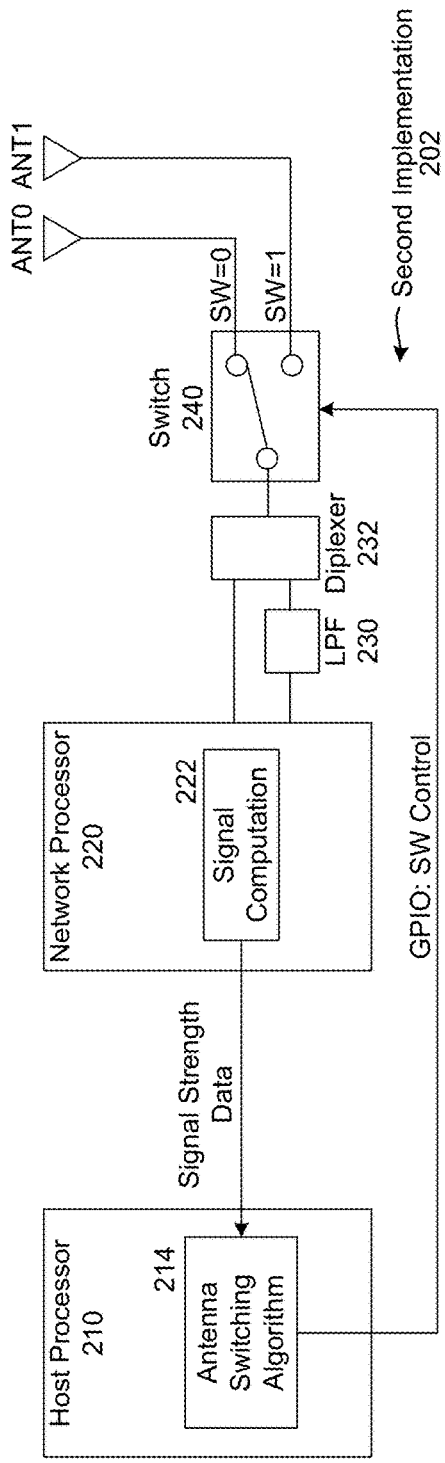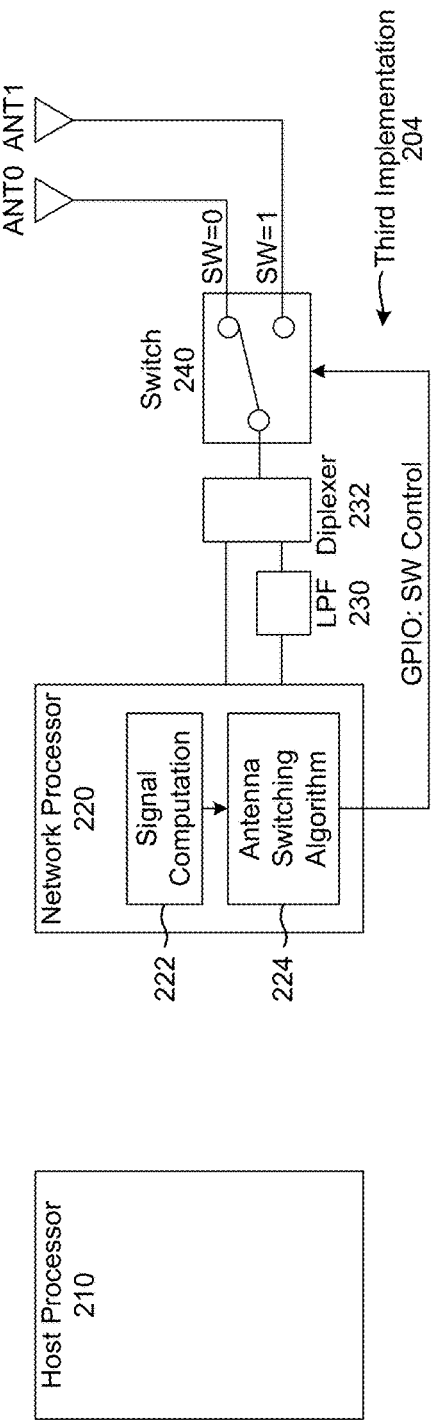
FIG. 2B
FIG. 2C

← First Orientation 310

| Network (SSID) | Antenna (ANT) | Signal Strength (RSSI) |
|---|---|---|
| Network 1 | ANT0 | -50 |
| Network 1 | ANT1 | -70 |

First Network Scan 312

← Second Orientation 320

| Network (SSID) | Antenna (ANT) | Signal Strength (RSSI) |
|---|---|---|
| Network 1 | ANT0 | -65 |
| Network 1 | ANT1 | -55 |

Second Network Scan 322

FIG. 4A

Network Scan 410

| Network (SSID) | Antenna (ANT) | Signal Strength (RSSI) |
|---|---|---|
| Network A | ANT0 | -50 |
| Network B | ANT0 | -60 |
| Network C | ANT0 | -70 |

Network Scan 412

| Network (SSID) | Antenna (ANT) | Signal Strength (RSSI) |
|---|---|---|
| Network D | ANT1 | -50 |
| Network C | ANT1 | -60 |
| Network B | ANT1 | -70 |

FIG. 4B

Assignment Table 420

| Network (SSID) | Antenna (ANT) |
|---|---|
| Network A | ANT0 |
| Network B | ANT0 |
| Network C | ANT1 |
| Network D | ANT1 |

ANTENNA SWITCHING

BACKGROUND

With the advancement of technology, the use and popularity of electronic devices has increased considerably. Electronic devices are commonly used to connect to wireless networks in order to send and receive data. Disclosed herein are technical solutions to improve wireless performance of a device that has multiple antennas when the device is connected to the wireless networks.

BRIEF DESCRIPTION OF DRAWINGS

For a more complete understanding of the present disclosure, reference is now made to the following description taken in conjunction with the accompanying drawings.

FIGS. 2A-2C illustrate examples of different antenna switching implementations according to embodiments of the present disclosure.

FIGS. 4A-4B illustrate examples of network scans and an antenna assignment table according to embodiments of the present disclosure.

DETAILED DESCRIPTION

Electronic devices commonly connect to wireless networks to send and receive data. A full size antenna positioned in an optimal location in a device may provide adequate performance regardless of an orientation of the device or proximity to nearby objects. However, reducing a size of the device imposes design limitations that affect a size and/or location of antenna(s) and antenna circuitry included in the device. As a result, performance of the antenna circuitry may vary due to static conditions (e.g., wall that the device is mounted on), dynamic conditions (e.g., objects or people in proximity to the device) and/or an orientation of the device. For example, objects and/or people in proximity to the device 102 and/or the orientation of the device 102 may reduce an efficiency of the antenna(s).

To improve a performance of antenna circuitry, devices, systems and methods are disclosed that dynamically select between two or more antennas. For example, a device may include a first antenna and a second antenna and may dynamically select between the first antenna and the second antenna as conditions occur. Thus, the device may connect to a wireless network using the first antenna at a first time and then may perform an antenna switching algorithm and determine to connect to the wireless network using the second antenna at a second time. In some examples, the device may include more than two antennas and may dynamically select at least two antennas using the antenna switching algorithm.

Figure 1:
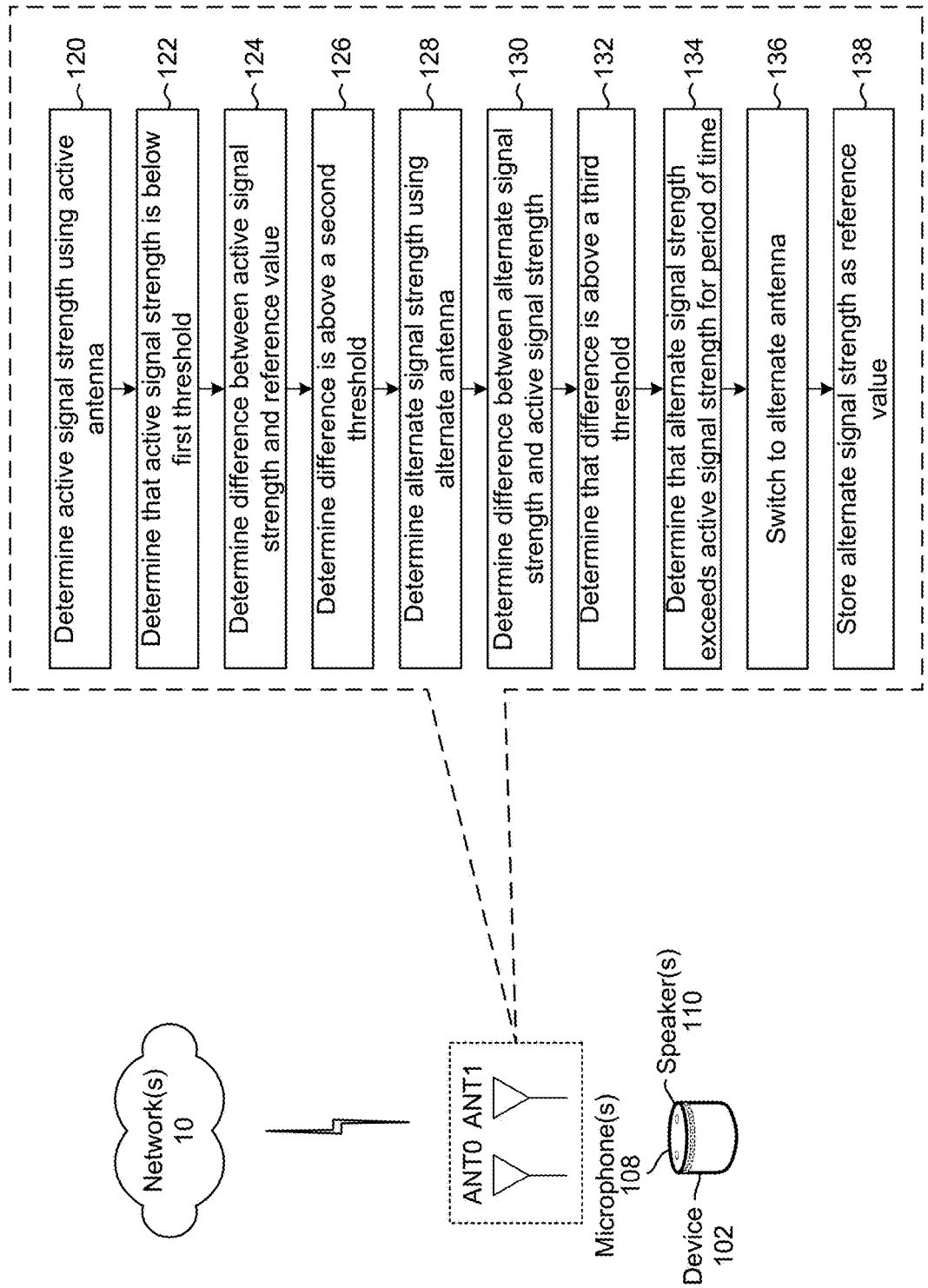
FIG. 1 illustrates a system according to embodiments of the present disclosure.

FIG. 1 illustrates a high-level conceptual block diagram of an antenna switching algorithm implemented in a device 102. The device 102 may include a first antenna ANT0, a second antenna ANT1, microphone(s) 108 and/or speakers 110. The device 102 may output audio using the speaker(s) 110, may capture audio data using the microphone(s) 108 and may detect voice commands included in the audio data. While FIG. 1 illustrates the device 102 as a speech-enabled device without a display and/or camera, the disclosure is not limited thereto and the device 102 may include a display, camera and/or other components not illustrated in FIG. 1 without departing from the present disclosure.

As illustrated in FIG. 1, the device 102 may wirelessly connect to network(s) 10 using either the first antenna ANT0 or the second antenna ANT1. For example, the device 102 may dynamically select between the first antenna ANT0 and the second antenna ANT1 based on signal strengths corresponding to each of the antennas, as will be discussed in greater detail below. The network(s) 10 may be a local or private network or may be part of a wider network. For example, the network(s) 10 may include a wired local area network (LAN), a wireless local area network (WLAN) (such as WiFi), Bluetooth, and/or wireless network, such as a Long Term Evolution (LTE) network, WiMAX network, 3G network, ZigBee, etc. The device 102 may connect to the network(s) 10 using any wireless networking technologies, such as WiFi, Bluetooth, LTE, WiMAX, 3G, ZigBee, or any other industrial, scientific and medical (ISM) radio bands. For example, the device 102 may connect to the network(s) 10 via a WLAN (e.g., service set identification (SSID), extended basic service set (ESS) or the like) and the device 102 may detect a basic service set identification (BSSID) (e.g., identification of an individual access point associated with the WLAN) corresponding to each access point in proximity to the device 102 using the first antenna ANT0 and/or the second antenna ANT1.

While FIG. 1 illustrates the device 102 including two antennas (e.g., ANT0 and ANT1), the disclosure is not limited thereto. Instead, the device 102 may include three or more antennas (e.g., ANT0, ANT1, . . . ANTn) and may select a single antenna and/or two or more antennas based on the signal strengths corresponding to each of the antennas without departing from the disclosure. To illustrate a first example, the device 102 may include multiple antennas (e.g., three or more) but may communicate with the network(s) 10 using a single antenna, so the device 102 may select an antenna associated with a highest signal strength. To illustrate a second example, the device 102 may include multiple antennas (e.g., three or more) and may communicate with the network(s) 10 using at least two antennas (e.g., LTE networks require a minimum of two antennas), so the device 102 may select two or more antennas associated with the highest signal strengths.

In some examples, a signal strength of a wireless network may be measured using Received Signal Strength Indicator (RSSI) values. However, the disclosure is not limited thereto and the signal strength may be measured using a signal to noise ratio (SNR) and/or other signal metrics known to one of skill in the art. For example, the device 102 may use RSSI values and/or SNR values when connecting to a WLAN network (e.g., WiFi), but may only use RSSI values when connecting to a Bluetooth network. Thus, any reference to a signal strength in the drawings or corresponding description may refer to an absolute power value (e.g., RSSI value) and/or a relative power value (e.g., SNR value) without departing from the disclosure.

As used herein, an active antenna refers to the antenna with which the device 102 is currently connected to the network(s) 10, whereas an alternate antenna refers to antenna that is not currently connected to the network(s) 10. For example, the device 102 may connect to the network(s) 10 using the first antenna ANT0 and therefore the first antenna ANT0 may be referred to as the active antenna and the second antenna ANT1 may be referred to as the alternate antenna. When connected to the network(s) 10 via the active antenna, the device 102 may measure a first signal strength of the network(s) 10 using the active antenna based on data packets that were correctly received from the network(s) 10 by the active antenna. However, as the alternate antenna is not connected to the network(s) 10, the device 102 may measure a second signal strength of the network(s) 10 using the alternate antenna using other techniques, such as sending probing data packets. For example, if the device 102 is connected to a WLAN network using WiFi, the device 102 may measure the second signal strength of the network(s) 10 using the alternate antenna by sending probe request (PROBE_REQ) packets to an access point of the network(s) 10 and receiving probe response (PROBE_RSP) packets from the access point. The device 102 may measure the second signal strength for other wireless protocols using techniques known to one of skill in the art without departing from the present disclosure.

As illustrated in FIG. 1, the device 102 may determine (120) an active signal strength using an active antenna. For example, the device 102 may determine RSSI values, SNR values or the like based on packets correctly received from the network(s) 10 by the active antenna (e.g., first antenna ANT0). Thus, any reference to a signal strength in the drawings or corresponding description may refer to an absolute power value (e.g., RSSI value) and/or a relative power value (e.g., SNR value) without departing from the disclosure. In some examples, the device 102 may determine the active signal strength by taking an average of RSSI values over a period of time.

The device 102 may determine (122) that the active signal strength is below a first threshold. For example, the first threshold may be an absolute value corresponding to a weak signal (e.g., −75 decibels relative to a milliwatt (dBm)), such that the device 102 continues to use the active antenna when the active signal strength exceeds the first threshold and may determine whether the alternate antenna has a stronger signal strength when the active signal strength drops below the first threshold.

As the active signal strength is below the first threshold, the device 102 may determine (124) a difference between the active signal strength and a reference value and may determine (126) that the difference exceeds a second threshold. For example, the reference value may be a reference signal strength generated when the device 102 last selected the active antenna, such that the difference corresponds to a drop in signal strength from the moment the device 102 most recently selected the active antenna to a current time. The second threshold may correspond to a hysteresis value (e.g., −5 decibels (dB)) that prevents the device 102 from continually entering a search mode and/or alternating between the antennas. For example, the second threshold prevents the device 102 from bouncing back and forth between the first antenna ANT0 and the second antenna ANT1 based on random variations to the active signal strength and the alternate signal strength when both are below the first threshold. Instead, the device 102 determines when the difference exceeds the second threshold, indicating that the active signal strength has dropped by a sufficient amount since the device 102 most recently selected the active antenna. When the device 102 determines that the active signal strength is below the first threshold and the difference exceeds the second threshold, the device 102 may determine to enter a search mode and dynamically select between the first antenna ANT0 and the second antenna ANT1.

The device 102 may determine (128) an alternate signal strength using the alternate antenna. For example, the device 102 may send probe request packets to the network(s) 10, may receive probe response packets from the network(s) 10 to the alternate antenna (e.g., second antenna ANT1) and may determine RSSI values, SNR values or the like based on the probe response packets. In some examples, the device 102 may determine the alternate signal strength by taking an average of RSSI values over a period of time.

The device 102 may determine (130) a difference between the alternate signal strength and the active signal strength and may determine (132) that the difference exceeds a third threshold. For example, the device 102 may subtract the active signal strength from the alternate signal strength to determine whether the alternate signal strength exceeds the active signal strength by at least the third threshold. As discussed above with regard to the second threshold, the third threshold may correspond to a hysteresis value (e.g., −5 dB) that prevents the device 102 from continually alternating between the antennas. For example, the third threshold prevents the device 102 from bouncing back and forth between the first antenna ANT0 and the second antenna ANT1 based on random variations to the active signal strength and the alternate signal strength. Instead, the device 102 determines when the difference exceeds the third threshold, indicating that the alternate signal strength is significantly stronger than the active signal strength.

The device 102 may determine (134) that the alternate signal strength exceeds the active signal strength for a period of time. For example, the device 102 may continue to monitor the active signal strength and the alternate signal strength and may determine to switch antennas after the alternate signal strength exceeds the active signal strength a number of monitoring cycles, the period of time or the like. The period of time also acts as a form of hysteresis, preventing the device 102 from bouncing back and forth between the first antenna ANT0 and the second antenna ANT1 by requiring that the active signal strength and the alternate signal strength be relatively stable prior to switching antennas.

When the device 102 determines that the alternate signal strength exceeds the active signal strength for the period of time, the device 102 may switch (136) to the alternate antenna (e.g., assign the alternate antenna to and/or associate the alternate antenna with a current network) and store (138) the alternate signal strength as a reference value for future antenna switching. For example, the device 102 may select the alternate antenna (e.g., second antenna ANT1) as the active antenna, select the active antenna (e.g., first antenna ANT0) as the alternate antenna and store the most recently measured alternate signal strength associated with the second antenna ANT0 as the reference value. Thus, if the device 102 performs step 124 at a second time, the device 102 may subtract the reference value (e.g., average RSSI value corresponding to the second antenna ANT1 at the time of switching) from an active signal strength (e.g., average RSSI value corresponding to the second antenna ANT1 at the second time).

The first threshold, the second threshold, the third threshold and the period of time may be tunable parameters selected by the device 102 and/or a user of the device 102 to control when the antenna switching algorithm switches from the active antenna to the alternate antenna. For example, the first threshold may be an absolute value corresponding to a weak signal and may be a static threshold (e.g., −75 dBm for all orientations/locations/networks), a dynamic threshold (e.g., −65 dBm for a first orientation/location/network, −75 dBm for a second orientation/location/network, etc.) or may vary. Similarly, the second threshold and/or the third threshold may correspond to a single hysteresis value (e.g., −5 dB for both) or two different hysteresis values (e.g., −3 dB or larger). As indicated above, the second threshold and the third threshold are relative values having units of dB, whereas the first threshold is an absolute value having units of dBm. However, the disclosure is not limited thereto and the first threshold may be a relative value without departing from the disclosure. For example, when the device 102 dynamically selects between antennas based on relative values (e.g., SNR values), the first, second and third thresholds may be relative values (e.g., units of dB).

Additional tunable parameters may be used, as will be discussed in greater detail below with regard to FIGS. 7A-7B. For example, the device 102 may calculate a moving average of the RSSI values and a desired number of RSSI values (e.g., 5) to include in the moving average may be a tunable parameter that varies based on device settings. Similarly, the period of time may be a tunable parameter that may vary based on device settings. In some examples, the device 102 may perform multiple comparison steps, such as comparing the active signal strength and the alternate signal strength at a first time, a second time and a third time, and the period of time may correspond to the number of iterations of the comparison step. In some examples, a first length of time (e.g., M ms) that the device 102 may determine the active signal strength and a second length of time (e.g., N ms) that the device 102 may determine the alternate signal strength may be tunable parameters that vary based on device settings. For example, the first length of time and the second length of time may be identical (e.g., 10 ms), although the present disclosure is not limited thereto and the first length of time and the second length of time may vary.

In order to reduce a size of the device 102, the device 102 may have design limitations affecting a size and/or location of antenna(s) and antenna circuitry. As a result, performance of the antenna circuitry may vary due to static conditions (e.g., wall when the device 102 is mounted), dynamic conditions (e.g., objects or people in proximity to the device 102) and/or an orientation of the device 102 relative to an access point of the network(s) 10. For example, objects and/or people in proximity to the device 102 and/or the orientation of the device 102 may reduce an efficiency of the antenna(s). To improve the performance of the antenna circuitry, the device 102 may include a first antenna ANT0 and a second antenna ANT1 and may dynamically select between the first antenna ANT0 and the second antenna ANT1 as conditions occur. Thus, the device 102 may connect to the network(s) 10 using the first antenna ANT0 at a first time and then may perform an antenna switching algorithm and determine to connect to the network(s) 10 using the second antenna ANT1 at a second time.

Figure 2A:
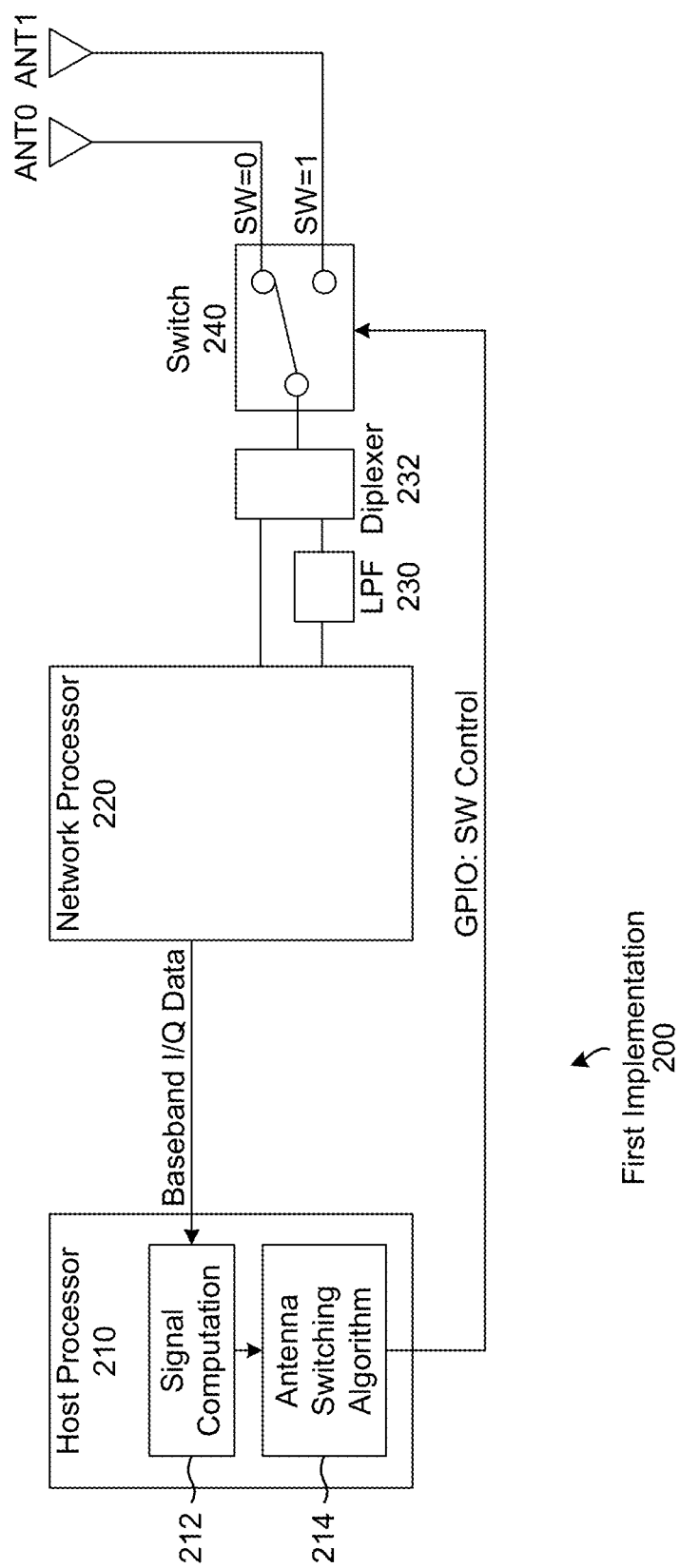

FIGS. 2A-2C illustrate examples of different antenna switching implementations according to embodiments of the present disclosure. As illustrated in FIGS. 2A-2C, the device 102 may include a host processor 210, a network processor 220, a low pass filter (LPF) 230, a diplexer 232, a switch 240, the first antenna ANT0 and the second antenna ANT1. For purposes of the present disclosure, the LPF 230 and the diplexer 232 may be used to implement frequency-domain multiplexing and are known to one of skill in the art.

The device 102 may dynamically select between the first antenna ANT0 and the second antenna ANT1 using an antenna switching algorithm. Inputs to the antenna switching algorithm are signal metric values, such as first signal strength(s) corresponding to the first antenna ANT0 and second signal strength(s) corresponding to the second antenna ANT1. Examples of signal metric values include Received Signal Strength Indicator (RSSI) values, signal to noise ratios (SNRs) and/or other signal metrics known to one of skill in the art. Thus, any reference to a signal strength in the drawings or corresponding description may refer to an absolute power value (e.g., RSSI value) and/or a relative power value (e.g., SNR value) without departing from the disclosure. The antenna switching algorithm may output a switch control signal (e.g., SW control) to the switch 240 instructing the switch 240 to select the first antenna ANT 0 (e.g., SW=0) or the second antenna ANT1 (e.g., SW=1).

As illustrated in FIGS. 2A-2C, the device 102 may implement the antenna switching algorithm using the host processor 210 and/or the network processor 220. For example, FIG. 2A illustrates a first implementation 200 in which all processing is performed by the host processor 210, FIG. 2B illustrates a second implementation 202 in which processing is performed by both the host processor 210 and the network processor 220, and FIG. 2C illustrates a third implementation 204 in which processing is performed by the network processor 220.

As illustrated in FIG. 2A, in the first implementation 200 the network processor 220 may output baseband quadrature signals (e.g., baseband I/Q data) to the host processor 210, the baseband quadrature signals including an in-phase signal (e.g., I) and an out-of-phase signal (e.g., Q). The host processor 210 may include signal computation circuitry 212 that may process the baseband quadrature signals to generate the signal metric values (e.g., signal strengths). The host processor 210 may also include an antenna switching algorithm 214 that may use the signal strengths to dynamically select an antenna. For example, the antenna switching algorithm 214 may send switch control signals to the switch 240 to select the first antenna ANT0 so that the antenna switching algorithm 214 may receive first signal strengths corresponding to the first antenna ANT0 and/or to select the second antenna ANT1 so that the antenna switching algorithm 214 may receive second signal strengths corresponding to the second antenna ANT1. Based on the first signal strengths and the second signal strengths, the antenna switching algorithm 214 may select the first antenna ANT0 or the second antenna ANT1 as the active antenna and may send a switch control signal to the switch 240 to select the active antenna for normal communication with the network(s) 10. The switch 240 may receive the switch control signal and select the corresponding antenna as the active antenna. Thus, the first implementation 200 illustrated in FIG. 2A illustrates the host processor 210 performing all of the processing using the signal computation circuitry 212 and the antenna switching algorithm 214.

In contrast, FIG. 2B illustrates the second implementation 202 with the network processor 220 including signal computation circuitry 222 that may generate the signal strength data (e.g., signal metric values) and output the signal strength data to the host processor 210. Instead of sending the baseband quadrature signals to the host processor 210, the network processor 220 determines the actual signal strength data and sends the signal strength data to be used by the antenna switching algorithm 214. As discussed above, the antenna switching algorithm 214 may select the first antenna ANT0 or the second antenna ANT1 as the active antenna and may send a switch control signal to the switch 240 to select the active antenna for normal communication with the network(s) 10. Thus, the second implementation 202 illustrated in FIG. 2B illustrates the network processor 220 performing some of the processing using the signal computation circuitry 222 and the host processor 210 performing other processing using the antenna switching algorithm 214.

In contrast, FIG. 2C illustrates the third implementation 204 having the network processor 220 including the signal computation circuitry 222 and an antenna switching algorithm 224. In the third implementation 204, the network processor 220 does not output baseband quadrature signals or signal strength data to the host processor 210. Instead, the signal computation circuitry 222 outputs the signal strength data to the antenna switching algorithm 224. As discussed above with regard to the antenna switching algorithm 214, the antenna switching algorithm 224 may select the first antenna ANT0 or the second antenna ANT1 as the active antenna and may send a switch control signal to the switch 240 to select the active antenna for normal communication with the network(s) 10. Thus, the third implementation illustrated in FIG. 2C illustrates the network processor 220 performing all of the processing using the signal computation circuitry 222 and the antenna switching algorithm 224.

Figure 3A:
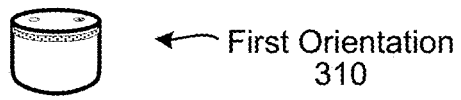
FIGS. 3A-3B illustrate examples of signal strengths depending on an orientation of the device according to embodiments of the present disclosure.
Figure 3B:
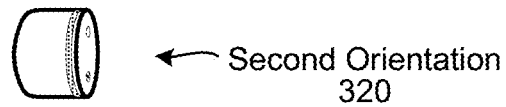

FIGS. 3A-3B illustrate examples of signal strengths depending on am orientation of the device according to embodiments of the present disclosure. As illustrated in FIG. 3A, the device 102 may perform a first network scan 312 in a first orientation 310. As shown in the first network scan 312, the first antenna ANT0 may detect Network 1 and the device 102 may measure a first signal strength (e.g., −50 dBm) associated with Network 1 using the first antenna ANT0. While the second antenna ANT1 may also detect Network 1, the device 102 may measure a second signal strength (e.g., −70 dBm) associated with Network 1 using the second antenna ANT1. Therefore, based on the first network scan 312, the device 102 may associate the first antenna ANT0 with Network 1 in the first orientation 310.

In contrast, as illustrated in FIG. 3B, the device 102 may perform a second network scan 322 in a second orientation 320. As shown in the second network scan 322, the first antenna ANT0 may detect Network 1 but the device 102 may measure a third signal strength (e.g., −65 dBm) associated with Network 1 using the first antenna ANT0. The second antenna ANT1 may also detect Network 1 but the device 102 may measure a fourth signal strength (e.g., −55 dBm) associated with Network 1 using the second antenna ANT1. Therefore, based on the second network scan 322, the device 102 may associate the second antenna ANT1 with Network 1 in the second orientation 320.

The description of FIGS. 3A-3B refers to the signal strengths values (e.g., Received Signal Strength Indicator (RSSI) values) as having units of dBm, which indicates an absolute value of power. However, the disclosure is not limited thereto and the signal strengths may have units of dB, which indicates a ratio between two power values, without departing from the disclosure. For example, while FIGS. 3A-3B illustrate the device 102 measuring RSSI values, the disclosure is not limited thereto and the device 102 may instead measure a signal to noise ratio (SNR) and/or other signal metrics known to one of skill in the art without departing from the disclosure. Thus, any reference to a signal strength in the drawings or corresponding description may refer to an absolute power value (e.g., RSSI value) and/or a relative power value (e.g., SNR value) without departing from the disclosure. For example, when the device 102 dynamically selects between antennas based on absolute values (e.g., RSSI values), the first threshold may be an absolute value (e.g., units of dBm) and the second and third thresholds may be relative values (e.g., units of dB). However, when the device 102 dynamically selects between antennas based on relative values (e.g., SNR values), the first, second and third thresholds may be relative values (e.g., units of dB).

The device 102 may determine an SNR value by comparing an absolute value of power associated with a network (e.g., RSSI value) to an absolute value of power associated with a noise floor. Thus, SNR values are positive values indicating a difference between the signal strength and the noise floor. For example, the device 102 may determine the noise floor (e.g., −90 dBm), may measure a first signal strength (e.g., −50 dBm) associated with Network 1 using the first antenna ANT0 and may determine a first SNR value based on a difference between the noise floor and the first signal strength (e.g., 40 dB). Similarly, the device 102 may measure a second signal strength (e.g., −70 dBm) associated with Network 1 using the second antenna ANT1 and may determine a second SNR value based on a difference between the noise floor and the second signal strength (e.g., 20 dB). Thus, instead of selecting the antenna using the first signal strength (e.g., −50 dBm) and the second signal strength (e.g., −70 dBm), as illustrated in the first network scan 312 shown in FIG. 3A, the device 102 may use the first SNR value (e.g., 40 dB) and the second SNR value (e.g., 20 dB).

FIGS. 4A-4B illustrate examples of network scans and an antenna assignment table according to embodiments of the present disclosure. As illustrated in FIG. 4A, the device 102 may perform a first network scan 410 using the first antenna ANT0 and may perform a second network scan 412 using the second antenna ANT1. As shown in the first network scan 410, the first antenna ANT0 may detect Network A, Network B and Network C, and the device 102 may measure a first signal strength (e.g., −50 dBm) associated with Network A, a second signal strength (e.g., −60 dBm) associated with Network B and a third signal strength (e.g., −70 dBm) associated with Network C.

As shown in the second network scan 412, the second antenna ANT1 may detect Network B, Network C and Network D, and the device 102 may measure the first signal strength (e.g., −50 dBm) associated with Network D, the second signal strength (e.g., −60 dBm) associated with Network C and the third signal strength (e.g., −70 dBm) associated with Network B.

FIG. 4B illustrates an example of an assignment table 420. The assignment table 420 indicates an association between a network and an antenna assigned to the network. For example, the device 102 may assign (e.g., associate) a first antenna to a first network as the first antenna is associated with a higher signal strength value (e.g., RSSI value) than other antennas. As illustrated in FIG. 4B, the assignment table 420 indicates that the first antenna ANT0 is assigned to Network A and Network B while the second antenna ANT1 is assigned to Network C and Network D. To generate the assignment table 420, the device 102 may first identify networks that were only detected using one of the antennas. For example, Network A was only detected using the first antenna ANT0 and Network D was only detected using the second antenna ANT1. Therefore, the device 102 may assign the first antenna ANT0 to Network A and may assign the second antenna ANT1 to Network D.

The device 102 may then identify networks that were detected using both of the antennas and may assign the antenna corresponding to a higher signal strength to an individual network. For example, both the first antenna ANT0 and the second antenna ANT1 detected Network B, but the second signal strength (e.g., −60 dBm) corresponding to the first antenna ANT0 is higher than the third signal strength (e.g., −70 dBm) corresponding to the second antenna ANT1. Therefore, the device 102 may assign the first antenna ANT0 to Network B. Similarly, both the first antenna ANT0 and the second antenna ANT1 detected Network C, but the second signal strength (e.g., −60 dBm) corresponding to the second antenna ANT1 is higher than the third signal strength (e.g., −70 dBm) corresponding to the first antenna ANT0. Therefore, the device 102 may assign the second antenna ANT1 to Network C.

In some examples, the device 102 may generate the assignment table 420 prior to initially connecting to a network. For example, the device 102 may generate the assignment table 420 when the device 102 first powers up and is not currently connected to a network. However, the disclosure is not limited thereto and the device 102 may generate and/or update the assignment table 420 while connected to a network. For example, the device 102 may update the assignment table 420 for multiple networks so that the device 102 may determine an appropriate antenna with which to connect to a new network. The device 102 may connect to the new network due to changes to a current network (e.g., signal strength associated with the current network drops below a threshold) and/or user input (e.g., device 102 receives input from the user selecting the new network).

When the device 102 is not connected to a network, the device 102 may generate a list of available networks (e.g., Network A, Network B, Network C and Network D) using the assignment table 420 and may display the list to a user to enable the user to select one of the networks and input a password or other authorization information associated with the selected network. For example, the device 102 may display the list of available networks and receive an input selecting Network C and providing a password for Network C. The device 102 may use the assignment table 420 to determine that the second antenna ANT1 is assigned to Network C and may connect to Network C via the second antenna ANT1.

FIGS. 4A-4B illustrate simple examples intended to conceptually illustrate differences between the first antenna ANT0 and the second antenna ANT1 and how the device 102 may generate an assignment table. Differences between the first antenna ANT0 and the second antenna ANT1 may be smaller and/or may vary over time and therefore the device 102 may perform multiple network scans and/or measure signal strengths for longer periods of time in order to generate the assignment table. Further, the examples illustrated in FIGS. 4A-4B may conceptually illustrate an example method that occurs when the device 102 powers on and has not connected to the network(s) 10 using either of the antennas. After connecting to the network(s) 10 using one of the antennas, the device 102 may use the example methods illustrated in FIGS. 6-7B to assign an antenna to a network and/or switch between the antennas, as described in greater detail below.

Figure 5A:
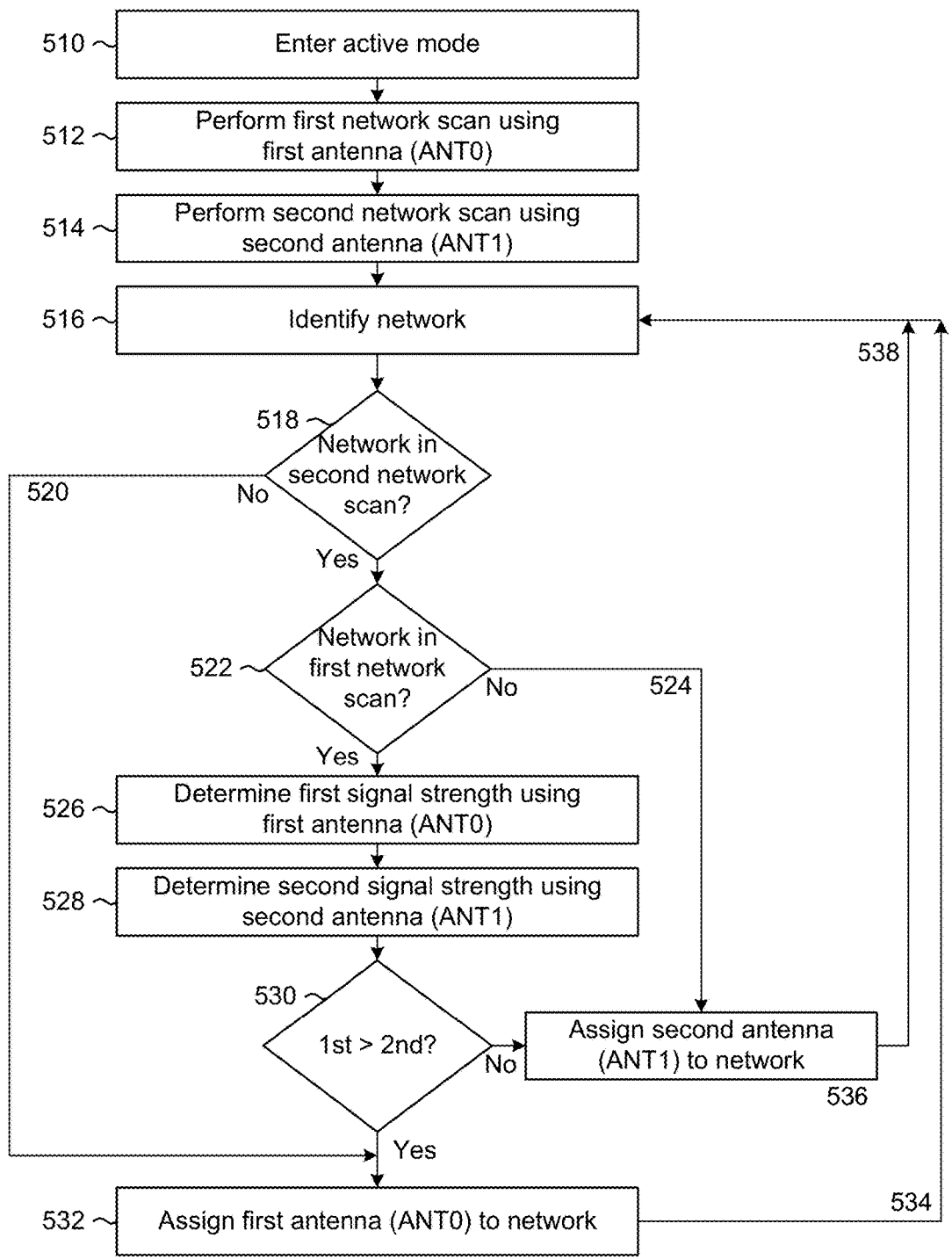
FIGS. 5A-5B are flowcharts conceptually illustrating an example method of generating an antenna assignment table and connecting to a network according to embodiments of the present disclosure.
Figure 5B:
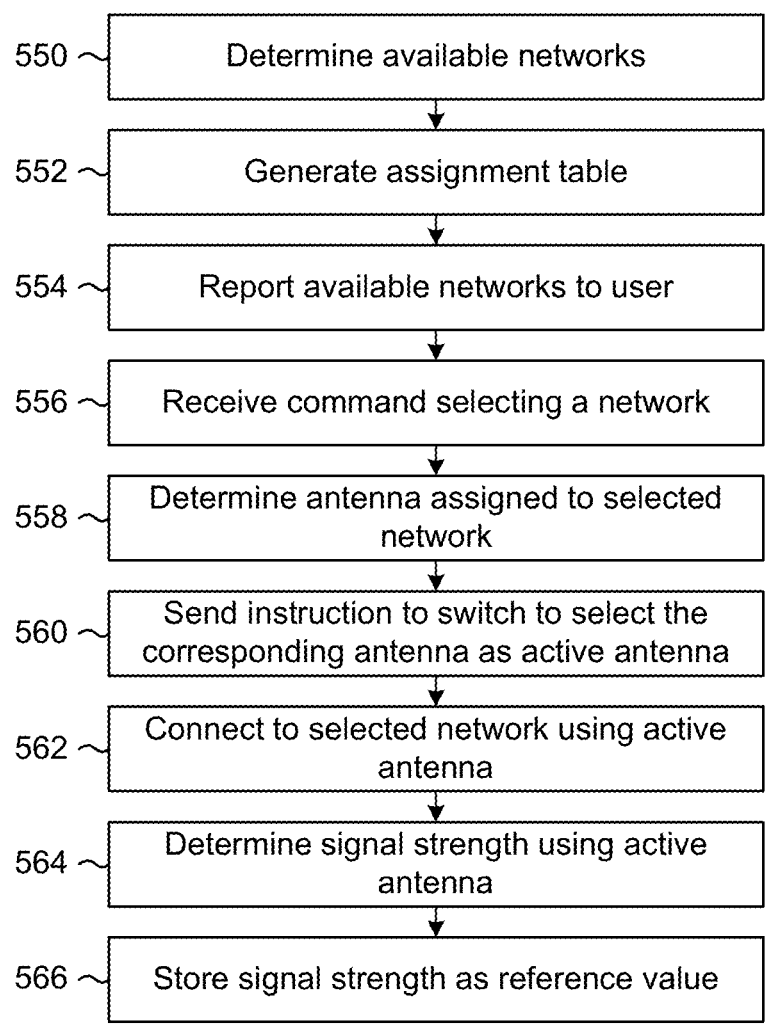

FIGS. 5A-5B are flowcharts conceptually illustrating an example method of generating an antenna assignment table and connecting to a network according to embodiments of the present disclosure. As illustrated in FIG. 5A, the device 102 may enter (510) an active mode. For example, the device 102 may be powered off, in a sleep mode, power saving mode or the like and may receive an input or command (e.g., external button press, detect a user in proximity to the device 102, detect a wire connecting to the device 102, etc.) to enter the active mode.

Prior to entering the active mode, the device 102 may not be connected to the network(s) 10 using either the first antenna ANT0 or the second antenna ANT1. Therefore, the device 102 may perform (512) a first network scan using the first antenna ANT0 and perform (514) a second network scan using the second antenna ANT1 to identify access points and/or networks in proximity to the device 102. To illustrate an example associated with a WLAN, the network scans may identify networks (e.g., service set identifications (SSIDs), extended basic service sets (ESSs), or the like) and/or individual access points (e.g., basic service set identifications (BSSIDs) associated with the networks that are in proximity to the device 102.

While FIGS. 5A-7B illustrate example methods of identifying and connecting to networks (e.g., SSIDs, ESSs, etc.), the disclosure is not limited thereto and the example methods may identify and connect to individual access points (e.g., BSSIDs) or the like without departing from the present disclosure. Similarly, while FIGS. 5A-7B illustrate example methods that may be specific to certain wireless technologies (e.g., WiFi), the disclosure is not limited thereto and the example methods may be performed with any wireless networking technology (e.g., WiFi, Bluetooth, LTE, WiMAX, 3G, ZigBee, or any other industrial, scientific and medical (ISM) radio band technology).

The device 102 may identify (516) a network included in the first network scan and/or the second network scan and may determine (518) if the network is included in the second network scan. If the network is not included in the second network scan, the device 102 may loop (520) to step 532, assign (532) the first antenna ANT0 to the network and loop (534) to step 516 to identify another network. For example, FIG. 4A illustrates that Network A is included in the first network scan 410 and not the second network scan 412, so the device 102 may assign the first antenna ANT0 to Network A.

If the network is included in the second network scan, the device 102 may determine (522) if the network is included in the first network scan. If the network is not included in the first network scan, the device 102 may loop (524) to step 536, assign (536) the second antenna ANT1 to the network and loop (536) to step 516 to identify another network. For example, FIG. 4A illustrates that Network D is included in the second network scan 412 and not in the first network scan 410, so the device 102 may assign the second antenna ANT1 to Network D.

If the network is included in the first network scan, the device 102 may determine that the network is included in both the first network scan and the second network scan and may perform additional steps to assign either the first antenna ANT0 or the second antenna ANT1 to the network. The device 102 may determine (526) a first signal strength associated with the network using the first antenna ANT0 and may determine (528) a second signal strength associated with the network using the second antenna ANT1. For example, FIG. 4A illustrates that the device 102 may determine a first signal strength (e.g., −60 dBm) associated with Network B using the first antenna ANT0 and a second signal strength (e.g., −70 dBm) associated with Network B using the second antenna ANT1. Similarly, the device 102 may determine a first signal strength (e.g., −70 dBm) associated with Network C using the first antenna ANT0 and a second signal strength (e.g., −60 dBm) associated with Network C using the second antenna ANT1. The device 102 may measure signal strength as an absolute value (e.g., absolute power value, such as an RSSI value with units of dBm), relative to a noise floor (e.g., relative power value, such as an SNR value with units of dB indicating a difference between an RSSI value and the noise floor), or using other techniques known to one of skill in the art without departing from the disclosure.

The device 102 may determine (530) if the first signal strength is greater than the second signal strength. For example, the device 102 may subtract the second signal strength (e.g., −70 dBm) associated with Network B using the second antenna ANT1 from the first signal strength (e.g., −60 dBm) associated with Network B using the first antenna ANT0 to determine a difference (e.g., 10 dB).

If the device 102 determines that the first signal strength is greater than the second signal strength (e.g., the difference is positive), the device 102 may assign (532) the first antenna ANT0 to the network and may loop (534) to step 516 and select another network. For example, FIG. 4A illustrates the device 102 determining that the first signal strength (e.g., −60 dBm) associated with Network B using the first antenna ANT0 is greater than the second signal strength (e.g., −70 dBm) associated with Network B using the second antenna ANT1 (e.g., the difference is 10 dB). Therefore, the device 102 may assign the first antenna ANT0 to Network B.

If the device 102 determines that the first signal strength is not greater than the second signal strength (e.g., the difference is negative), the device 102 may assign (536) the second antenna ANT1 to the network and may loop (538) to step 516 and select another network. For example, FIG. 4A illustrates the device 102 determining that the first signal strength (e.g., −70 dBm) associated with Network C using the first antenna ANT0 is less than the second signal strength (e.g., −60 dBm) associated with Network C using the second antenna ANT1 (e.g., the difference is −10 dB). Therefore, the device 102 may assign the second antenna ANT1 to Network C.

As illustrated in FIG. 5B, the device 102 may determine (550) available networks and generate (552) an assignment table, as discussed above with regard to FIG. 5A. To connect to a network, the device 102 may report (554) available networks to a user of the device and may receive (556) a command selecting a network with which to connect. The device 102 may determine (558) an antenna assigned to the selected network (e.g., first antenna ANT0 assigned to Networks A and B, second antenna ANT1 assigned to Networks C and D), may send (560) an instruction to a switch to select the corresponding antenna as the active antenna (e.g., SW=0 selects the first antenna ANT0, SW=1 selects the second antenna ANT1) and may connect (562) to the selected network using the active antenna.

After connecting to the selected network using the active antenna, the device 102 may determine (564) a signal strength using the active antenna and may store (566) the signal strength as a reference value. The reference value may be used in the example method illustrated in FIGS. 6 and/or 7A in order to determine a drop in signal strength since selecting the active antenna. In some examples, the device 102 may measure the signal strength after connecting to the selected network. However, the disclosure is not limited thereto and the device 102 may determine the signal strength using the first network scan or the second network scan, from previous measurements (e.g., first signal strength determined in step 524 or the second signal strength determined in step 526) or from the assignment table. For example, as part of associating a network with a corresponding antenna, the device 102 may store a signal strength measured using the corresponding antenna in the assignment table.

Figure 6:
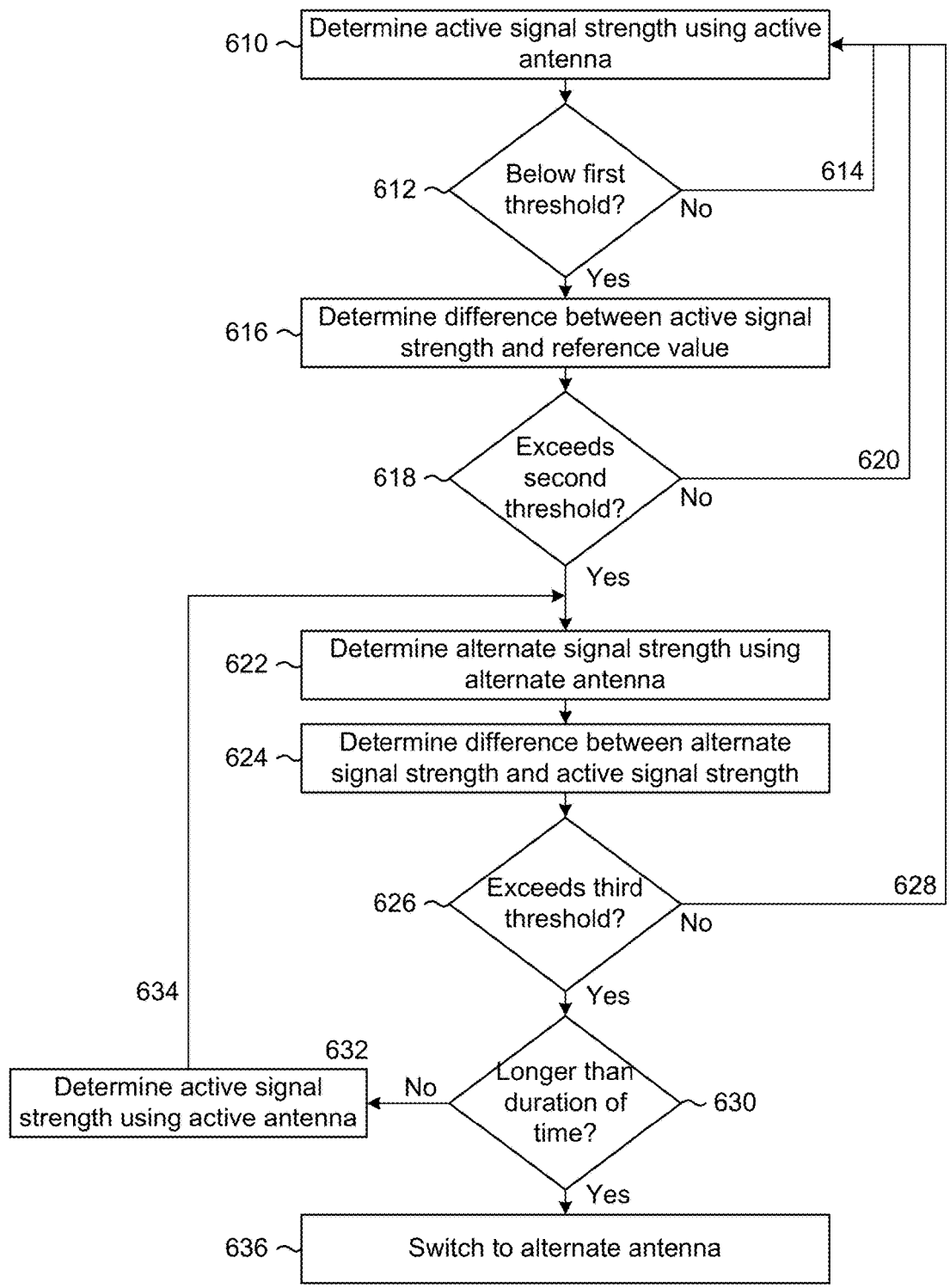
FIG. 6 is a flowchart conceptually illustrating an example method of antenna switching according to embodiments of the present disclosure.

FIG. 6 is a flowchart conceptually illustrating an example method of antenna switching according to embodiments of the present disclosure. As illustrated in FIG. 6, the device 102 may determine (610) an active signal strength using an active antenna. For example, the device 102 may determine RSSI values, SNR values or the like based on packets correctly received from the network(s) 10 by the active antenna (e.g., first antenna ANT0). In some examples, the device 102 may determine the active signal strength by taking an average of RSSI values over a period of time.

The device 102 may determine (612) whether the active signal strength is below a first threshold. For example, the first threshold may be an absolute value corresponding to a weak signal (e.g., −75 dBm), such that the device 102 continues to use the active antenna when the active signal strength exceeds the first threshold and may determine whether the alternate antenna has a stronger signal strength when the active signal strength drops below the first threshold. If the active signal strength is not below the first threshold, the device 102 may loop (614) to step 610.

If the active signal strength is below the first threshold, the device 102 may determine (616) a difference between the active signal strength and a reference value and may determine (618) whether the difference exceeds a second threshold. For example, the reference value may be a reference signal strength generated when the device 102 last selected the active antenna, such that the difference corresponds to a drop in signal strength from the moment the device 102 most recently selected the active antenna to a current time. If the difference does not exceed the second threshold, the device 102 may loop (620) to step 610.

The second threshold may correspond to a hysteresis value (e.g., −5 dB) that prevents the device 102 from continually entering a search mode and/or alternating between the antennas. For example, the second threshold prevents the device 102 from bouncing back and forth between the first antenna ANT0 and the second antenna ANT1 based on random variations to the active signal strength and the alternate signal strength when both are below the first threshold. Instead, the device 102 determines when the difference exceeds the second threshold, indicating that the active signal strength has dropped by a sufficient amount since the device 102 most recently selected the active antenna. When the device 102 determines that the active signal strength is below the first threshold and the difference exceeds the second threshold, the device 102 may determine to enter a search mode and dynamically select between the first antenna ANT0 and the second antenna ANT1.

The device 102 may determine (622) an alternate signal strength using the alternate antenna. For example, the device 102 may send probe request packets to the network(s) 10, may receive probe response packets from the network(s) 10 to the alternate antenna (e.g., second antenna ANT1) and may determine RSSI values, SNR values or the like based on the probe response packets. In some examples, the device 102 may determine the alternate signal strength by taking an average of RSSI values over a period of time.

The device 102 may determine (624) a difference between the alternate signal strength and the active signal strength and may determine (626) whether the difference exceeds a third threshold. For example, the device 102 may subtract the active signal strength from the alternate signal strength to determine whether the alternate signal strength exceeds the active signal strength by at least the third threshold. If the difference does not exceed the third threshold, the device 102 may loop (628) to step 610.

As discussed above with regard to the second threshold, the third threshold may correspond to a hysteresis value (e.g., −5 dB) that prevents the device 102 from continually alternating between the antennas. For example, the third threshold prevents the device 102 from bouncing back and forth between the first antenna ANT0 and the second antenna ANT1 based on random variations to the active signal strength and the alternate signal strength. Instead, the device 102 determines when the difference exceeds the third threshold, indicating that the alternate signal strength is significantly stronger than the active signal strength.

If the device 102 determines that the difference exceeds the third threshold, the device 102 may determine (630) whether the difference exceeds the third threshold for longer than a duration of time. For example, the device 102 may continue to monitor the active signal strength and the alternate signal strength and may determine to switch antennas after the alternate signal strength exceeds the active signal strength a number of monitoring cycles, the duration of time or the like. The duration of time also acts as a form of hysteresis, preventing the device 102 from bouncing back and forth between the first antenna ANT0 and the second antenna ANT1 by requiring that the active signal strength and the alternate signal strength be relatively stable prior to switching antennas. If the device 102 determines that the difference exceeds the third threshold for less than the duration of time (e.g., the alternate signal strength has not been greater than the active signal strength by the third threshold for the duration of time), the device 102 may determine (632) an active signal strength using the active antenna and loop (634) to step 622. In some examples, the device 102 may determine the active signal strength using the active antenna for a fixed period of time (e.g., 10 ms).

If the device 102 determines that the alternate signal strength exceeds the active signal strength by the third threshold for longer the duration of time, the device 102 may switch (636) to the alternate antenna and store the alternate signal strength as a reference value for future antenna switching. For example, the device 102 may select the alternate antenna (e.g., second antenna ANT1) as the active antenna, select the active antenna (e.g., first antenna ANT0) as the alternate antenna and store the most recently measured alternate signal strength associated with the second antenna ANT0 as the reference value. Thus, if the device 102 performs step 616 at a second time, the device 102 may subtract the reference value (e.g., average RSSI value corresponding to the second antenna ANT1 at the time of switching) from an active signal strength (e.g., average RSSI value corresponding to the second antenna ANT1 at the second time).

The first threshold, the second threshold, the third threshold and the period of time may be tunable parameters selected by the device 102 and/or a user of the device 102 to control when the antenna switching algorithm switches from the active antenna to the alternate antenna. For example, the first threshold may correspond to a weak signal and may be a static threshold (e.g., −75 dBm for all orientations/locations/networks), a dynamic threshold (e.g., −65 dBm for a first orientation/location/network, −75 dBm for a second orientation/location/network, etc.) or may vary. Similarly, the second threshold and/or the third threshold may correspond to a single hysteresis value (e.g., −5 dB for both) or two different hysteresis values (e.g., −3 dB or larger). As indicated above, the second threshold and the third threshold are relative values having units of dB, whereas the first threshold is an absolute value having units of dBm. However, the disclosure is not limited thereto and the first threshold may be a relative value without departing from the disclosure. For example, when the device 102 dynamically selects between antennas based on relative values (e.g., SNR values), the first, second and third thresholds may be relative values (e.g., units of dB). The second threshold and the third threshold are examples of power hysteresis, whereas the duration of time used in step 630 is an example of time hysteresis.

Additional tunable parameters may be used, as will be discussed in greater detail below with regard to FIGS. 7A-7B. For example, the device 102 may calculate a moving average of the RSSI values and a desired number of RSSI values (e.g., 5) to include in the moving average may be a tunable parameter that varies based on device settings. Similarly, the duration of time may be a tunable parameter that may vary based on device settings. In some examples, the device 102 may perform multiple comparison steps, such as comparing the active signal strength and the alternate signal strength at a first time, a second time and a third time, and the period of time may correspond to the number of iterations of the comparison step. In some examples, a first length of time (e.g., M ms) that the device 102 may determine the active signal strength and a second length of time (e.g., N ms) that the device 102 may determine the alternate signal strength may be tunable parameters that vary based on device settings. For example, the first length of time and the second length of time may be identical (e.g., 10 ms), although the present disclosure is not limited thereto and the first length of time and the second length of time may vary.

Figure 7A:
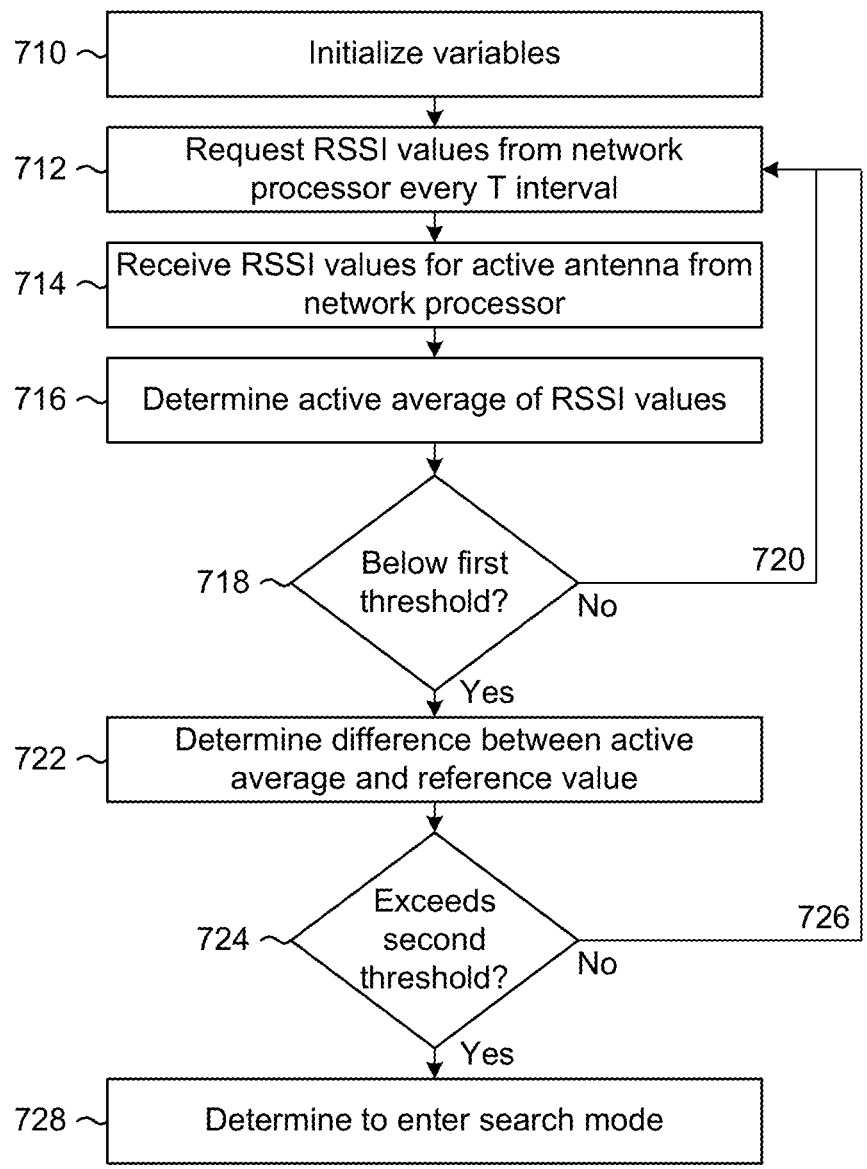
FIGS. 7A-7B are flowcharts conceptually illustrating example methods of antenna switching according to embodiments of the present disclosure.
Figure 7B:
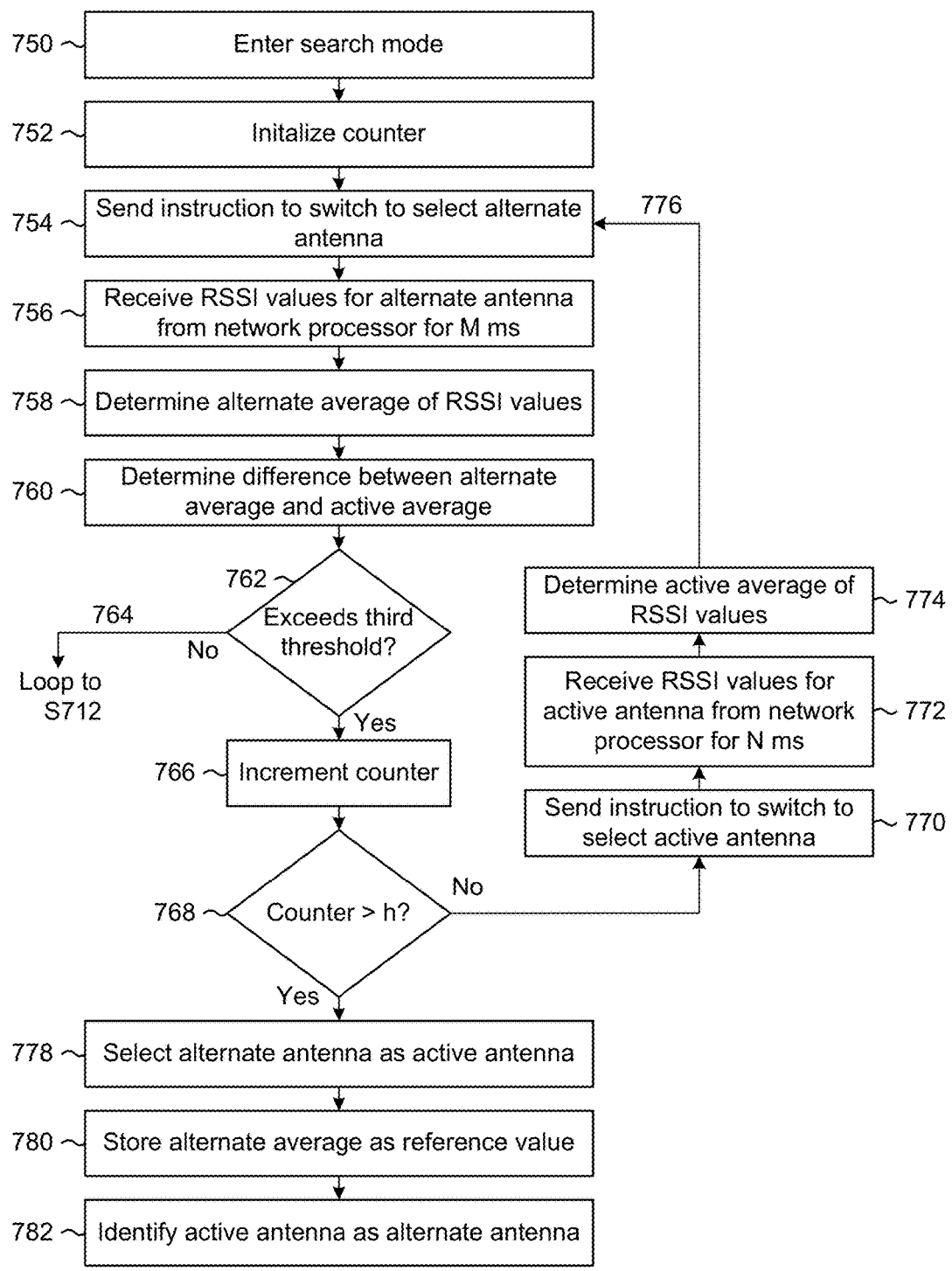

FIGS. 7A-7B are flowcharts conceptually illustrating example methods of antenna switching according to embodiments of the present disclosure. FIGS. 7A-7B illustrates the first implementation 200 and/or the second implementation 202 described above with regard to FIGS. 2A-2B, in which the host processor 210 includes the antenna switching algorithm 214. As illustrated in FIGS. 7A-7B, the host processor 210 may request signal strength data (e.g., RSSI values) from the network processor 220, which corresponds to the second implementation 202. However, the disclosure is not limited thereto and the host processor 210 may request the baseband quadrature signals (e.g., baseband I/Q data) from the network processor 220 (e.g., first implementation 200) without departing from the disclosure. Additionally or alternatively, the network processor 220 may include the antenna switching algorithm 224 described with regard to the third implementation 204 and the antenna switching algorithm 224 may request the signal strength data (e.g., RSSI values) from the signal computation circuitry 222. While FIGS. 7A-7B illustrate a specific example of the signal strength data corresponding to RSSI values, the disclosure is not limited thereto and the signal strength data may vary based on the wireless technology.

As illustrated in FIG. 7A, the device 102 may initialize (710) variables when beginning the antenna switching algorithm. The device 102 (e.g., host processor 210) may request (712) RSSI values from a network processor (e.g., network processor 220) every T interval, may receive (714) RSSI values for the active antenna from the network processor and may determine (716) an active average of the RSSI values. For example, the average of the RSSI values may be a moving average, a weighted average or the like determined based on a fixed number (e.g., k) of samples, such as k=5 samples or k=10 samples. The interval (e.g., T) may be a tunable parameter controlling how frequently the device 102 receives an individual RSSI value from the network processor. For example, the interval T may select a fast reporting schedule (e.g., T=100 ms, corresponding to an individual RSSI value every 100 ms) or a slow reporting schedule (e.g., T=500 ms, corresponding to an individual RSSI value every 500 ms). Additionally or alternatively, the value of T may be based on the number of samples (e.g., k) and a period of time to include in the active average. For example, if the device 102 wants the active average to correspond to 1 second of RSSI values, the device 102 may determine the active average using first values (e.g., T=100 ms and k=10), second values (e.g., T=200 ms and k=5), third values (e.g., T=500 ms and k=2) or the like.

The device 102 may determine (718) whether the active average is below a first threshold. For example, the first threshold may be an absolute value corresponding to a weak signal (e.g., −75 dBm), such that the device 102 continues to use the active antenna when the active average exceeds the first threshold and may determine whether the alternate antenna has a stronger signal strength when the active average drops below the first threshold. The first threshold may be a static threshold (e.g., −75 dBm for all orientations/locations/networks), a dynamic threshold (e.g., −65 dBm for a first orientation/location/network, −75 dBm for a second orientation/location/network, etc.) or may vary. If the active average is not below the first threshold, the device 102 may loop (720) to step 712.

If the active average is below the first threshold, the device 102 may determine (722) a difference between the active average and a reference value and may determine (724) whether the difference exceeds a second threshold. For example, the reference value may be a reference signal strength generated when the device 102 last selected the active antenna, such that the difference corresponds to a drop in signal strength from the moment the device 102 most recently selected the active antenna to a current time. If the difference does not exceed the second threshold, the device 102 may loop (726) to step 712.

The second threshold may correspond to a hysteresis value (e.g., −5 dB) that prevents the device 102 from continually entering a search mode and/or alternating between the antennas. For example, the second threshold prevents the device 102 from bouncing back and forth between the first antenna ANT0 and the second antenna ANT1 based on random variations to the active average. Instead, the device 102 determines when the difference exceeds the second threshold, indicating that the active average has dropped by a sufficient amount since the device 102 most recently selected the active antenna. When the device 102 determines that the active average is below the first threshold and the difference exceeds the second threshold, the device 102 may determine (728) to enter a search mode and dynamically select between the first antenna ANT0 and the second antenna ANT1.

As illustrated in FIG. 7B, the device 102 may enter (750) the search mode and may initialize (752) a counter. The device 102 may send (754) an instruction to a switch to select the alternate antenna, may receive (756) RSSI values for the alternate antenna from the network processor for a period of time (e.g., M) and may determine (758) an alternate average of the RSSI values. For example, the average of the RSSI values may be a moving average, a weighted average or the like determined based on a fixed number (e.g., k) of samples, such as k=5 samples or k=10 samples. The period of time (e.g., M) may be a tunable parameter controlling how long the RSSI values are measured (e.g., 10 seconds, 1 second, 500 ms, etc.). In order to determine the RSSI values, the device 102 may send probe request packets to the network(s) 10, may receive probe response packets from the network(s) 10 to the alternate antenna (e.g., second antenna ANT1) and may determine RSSI values, SNR values or the like based on the probe response packets. Additionally or alternatively, the RSSI values may be measured using beacon signals or other techniques known to one of skill in the art.

The device 102 may determine (760) a difference between the alternate average and the active average and may determine (762) whether the difference exceeds a third threshold. For example, the device 102 may subtract the active average from the alternate average to determine whether the alternate average exceeds the active average by at least the third threshold. The second threshold and/or the third threshold may correspond to a single hysteresis value (e.g., −5 dB for both) or two different hysteresis values (e.g., −3 dB or larger). If the difference does not exceed the third threshold, the device 102 may loop (764) to step 712.

As discussed above with regard to the second threshold, the third threshold may correspond to a hysteresis value (e.g., −5 dB) that prevents the device 102 from continually alternating between the antennas. For example, the third threshold prevents the device 102 from bouncing back and forth between the first antenna ANT0 and the second antenna ANT1 based on random variations to the active average and the alternate average. Instead, the device 102 determines when the difference exceeds the third threshold, indicating that the alternate average is significantly stronger than the active average. As indicated above, the second threshold and the third threshold are relative values having units of dB, whereas the first threshold is an absolute value having units of dBm. However, the disclosure is not limited thereto and the first threshold may be a relative value without departing from the disclosure. For example, when the device 102 dynamically selects between antennas based on relative values (e.g., SNR values), the first, second and third thresholds may be relative values (e.g., units of dB).

If the device 102 determines that the difference exceeds the third threshold, the device 102 may increment (766) the counter and may determine (768) whether a value of the counter exceeds a fixed value (e.g., h). For example, the fixed value may be equal to three (e.g., h=3), requiring the device 102 to determine that the difference between the alternate average and the active average exceeds the third threshold three times before proceeding.

If the value of the counter does not exceed the fixed value, the device 102 may send (770) an instruction to the switch to select the active antenna, may receive (772) RSSI values for the active antenna from the network processor for a period of time (e.g., N), may determine (774) an active average of the RSSI values and may loop (776) to step 754. For example, the average of the RSSI values may be a moving average, a weighted average or the like determined based on a fixed number (e.g., k) of samples, such as k=5 samples or k=10 samples. The period of time (e.g., N) may be a tunable parameter controlling how long the RSSI values are measured (e.g., 10 seconds, 1 second, 500 ms, etc.).

If the value of the counter exceeds the fixed value, the device 102 may select (778) the previous alternate antenna (e.g., ANT1) as a current active antenna, store (780) the alternate average as the reference value and identify (782) the previous active antenna (e.g., ANT0) as a current alternate antenna.

Figure 8:
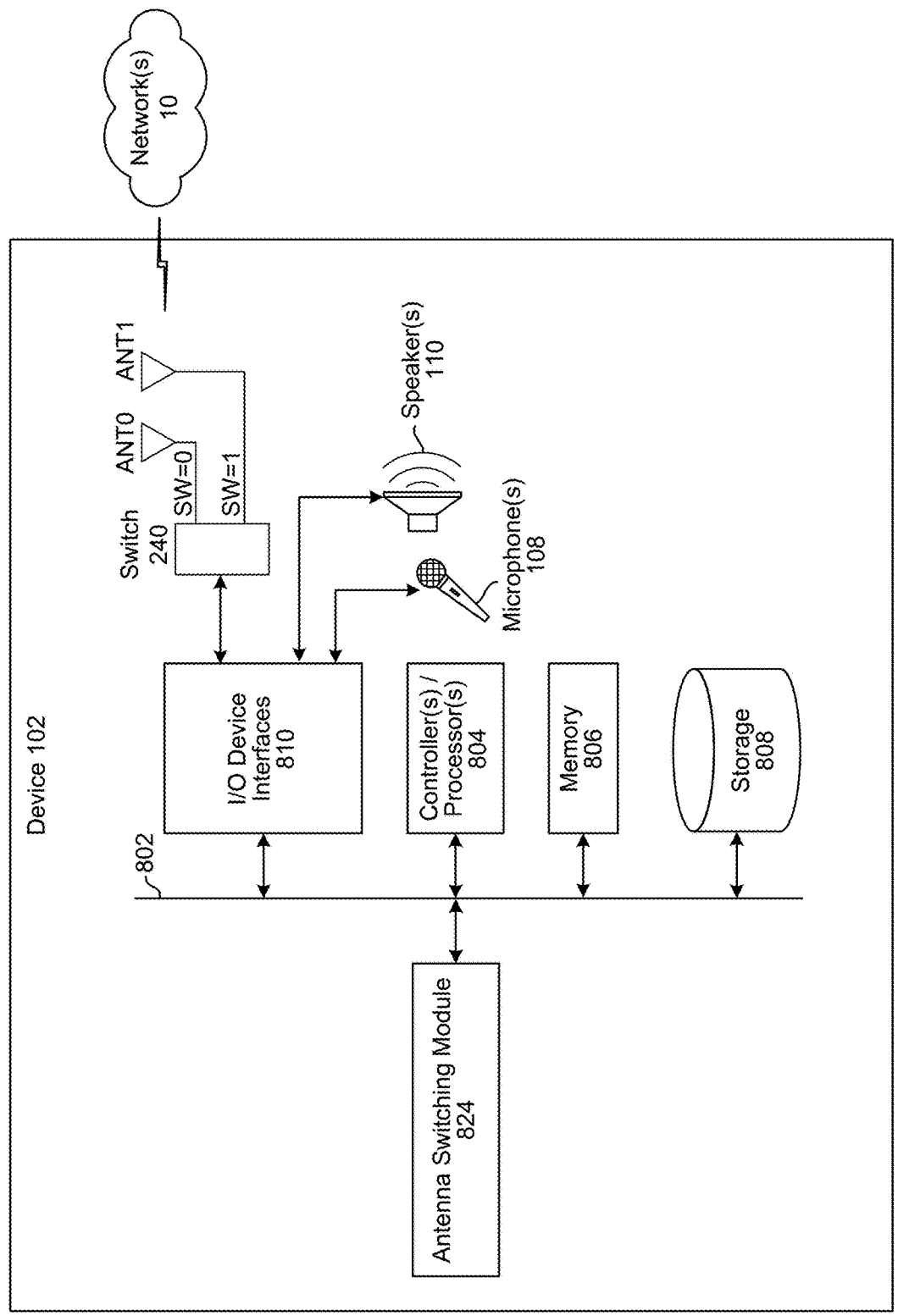
FIG. 8 is a block diagram conceptually illustrating example components of a device according to embodiments of the present disclosure.

FIG. 8 is a block diagram conceptually illustrating a local device 102 using an antenna switching algorithm. The device 102 may be an electronic device capable of connecting to the network(s) 10. Examples of electronic devices may include computers (e.g., a desktop, a laptop, a server or the like), portable devices (e.g., a camera (such as a 360° video camera, a security camera, a mounted camera, a portable camera or the like), smart phone, tablet or the like), media devices (e.g., televisions, video game consoles or the like), speech-enabled devices or the like.

As illustrated in FIG. 8, the device 102 may include an address/data bus 802 for conveying data among components of the device 102. Each component within the device 102 may also be directly connected to other components in addition to (or instead of) being connected to other components across the bus 802.

The device 102 may include one or more controllers/processors 804, that may each include a central processing unit (CPU) for processing data and computer-readable instructions, and a memory 806 for storing data and instructions. The memory 806 may include volatile random access memory (RAM), non-volatile read only memory (ROM), non-volatile magnetoresistive (MRAM) and/or other types of memory. The device 102 may also include a data storage component 808, for storing data and controller/processor-executable instructions (e.g., instructions to perform the algorithm illustrated in FIGS. 1, 5A, 5B, 6, 7A and/or 7B). The data storage component 808 may include one or more non-volatile storage types such as magnetic storage, optical storage, solid-state storage, etc. The device 102 may also be connected to removable or external non-volatile memory and/or storage (such as a removable memory card, memory key drive, networked storage, etc.) through the input/output device interfaces 810.

The device 102 includes input/output device interfaces 810. A variety of components may be connected through the input/output device interfaces 810, such as microphone(s) 108 and/or speakers 110 connected to the device 102. However, the disclosure is not limited thereto and the device 102 may not include microphone(s) 108 or speakers 110. Thus, microphone(s) 108, speakers 110 and/or other components (e.g., camera, display, etc.) may be integrated into the device 102 or may be separate from the device 102 without departing from the disclosure. In some examples, the device 102 may include an inertial measurement unit (IMU), gyroscope, accelerometers or other component configured to provide motion data or the like associated with the device 102. If an array of microphones 108 is included, approximate distance to a sound's point of origin may be performed acoustic localization based on time and amplitude differences between sounds captured by different microphones of the array. The device 102 (using microphone (s) 108, etc.) may be configured to determine audio data corresponding to detected audio.

The input/output device interfaces 810 may be configured to operate with network(s) 10, for example a wireless local area network (WLAN) (such as WiFi), Bluetooth, ZigBee and/or wireless networks, such as a Long Term Evolution (LTE) network, WiMAX network, 3G network, etc. The network(s) 10 may include a local or private network or may include a wide network such as the internet. Devices may be connected to the network(s) 10 through either wired or wireless connections.

The input/output device interfaces 810 may also include an interface for an external peripheral device connection such as universal serial bus (USB), FireWire, Thunderbolt, Ethernet port or other connection protocol that may connect to network(s) 10. The input/output device interfaces 810 may also include a connection to switch 240, first antenna ANT0 and/or second antenna ANT1 to connect one or more network(s) 10 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The device 102 further includes an antenna switching module 824, which may comprise processor-executable instructions stored in storage 808 to be executed by controller(s)/processor(s) 804 (e.g., software, firmware, hardware, or some combination thereof). For example, components of the antenna switching module 824 may be part of a software application running in the foreground and/or background on the device 102. The antenna switching module 824 may control the device 102 as discussed above, for example with regard to FIGS. 1, 5A, 5B, 6, 7A and/or 7B. Some or all of the controllers/modules of the antenna switching module 824 may be executable instructions that may be embedded in hardware or firmware in addition to, or instead of, software. In one embodiment, the device 102 may operate using an Android operating system (such as Android 4.3 Jelly Bean, Android 4.4 KitKat or the like), an Amazon operating system (such as FireOS or the like), or any other suitable operating system.

Executable computer instructions for operating the device 102 and its various components may be executed by the controller(s)/processor(s) 804, using the memory 806 as temporary "working" storage at runtime. The executable instructions may be stored in a non-transitory manner in non-volatile memory 806, storage 808, or an external device. Alternatively, some or all of the executable instructions may be embedded in hardware or firmware in addition to or instead of software.

The components of the device 102, as illustrated in FIG. 8, are exemplary, and may be located a stand-alone device or may be included, in whole or in part, as a component of a larger device or system.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, video capturing devices, video game consoles, speech processing systems, distributed computing environments, etc. Thus the modules, components and/or processes described above may be combined or rearranged without departing from the scope of the present disclosure. The functionality of any module described above may be allocated among multiple modules, or combined with a different module. As discussed above, any or all of the modules may be embodied in one or more general-purpose microprocessors, or in one or more special-purpose digital signal processors or other dedicated microprocessing hardware. One or more modules may also be embodied in software implemented by a processing unit. Further, one or more of the modules may be omitted from the processes entirely.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for selecting an antenna on a device, the method comprising:
   performing a first network scan using a first antenna on the device, the first network scan identifying a first wireless network;
   performing a second network scan using a second antenna on the device, the second network scan identifying the first wireless network;
   determining a first received signal strength value of the first wireless network using the first antenna;
   determining a second received signal strength value of the first wireless network using the second antenna;
   determining that the second received signal strength value is greater than the first received signal strength value;
   associating the second antenna with the first wireless network;
   connecting to the first wireless network using the second antenna;
   storing, at a first time, the second received signal strength value as a reference signal strength value, the reference signal strength value indicating a beginning value associated with the second antenna and used to determine when to switch to the first antenna;
   determining, at a second time after the first time, a third received signal strength value associated with the first wireless network using the second antenna;
   determining that the third received signal strength value is below a first threshold value, the first threshold value corresponding to an absolute value associated with a weak signal;
   determining an absolute difference between the third received signal strength value and the reference signal strength value;
   determining that the absolute difference is above a second threshold value, the second threshold value corresponding to a relative value used for hysteresis; and
   sending, using the first antenna, a probe request to the first wireless network, the probe request instructing the first wireless network to send a probe response to the device, wherein the device is configured to use the probe response to measure a fourth received signal strength value associated with the first wireless network using the first antenna.

2. The computer-implemented method of claim 1, further comprising:
   detecting a second wireless network during the first network scan;
   determining that the second wireless network is not detected during the second network scan;
   associating the first antenna with the second wireless network;
   detecting a third wireless network during the second network scan;
   determining that the third wireless network is not detected during the first network scan; and
   associating the second antenna with the third wireless network.

3. The computer-implemented method of claim 1, further comprising:
   receiving, using the first antenna, the probe response from the first wireless network;
   determining the fourth received signal strength value associated with the first wireless network using the first antenna;
   determining a second difference by subtracting the third received signal strength value from the fourth received signal strength value;
   determining that the second difference is above the second threshold value;
   incrementing a counter value, the counter value indicating a number of times that the second difference is above the second threshold value;

determining that the counter value is above a first value, the first value corresponding to a number of repetitions before the device selects the first antenna;

connecting to the first wireless network using the first antenna; and storing the fourth received signal strength value as a second reference signal strength value.

4. The computer-implemented method of claim 3, wherein:

determining the fourth signal strength value further comprises:

receiving, by a host processor from a network processor, the fourth received signal strength value, the host processor configured to control the device, the network processor configured to send and receive data using the first antenna or the second antenna, and connecting to the first wireless network using the first antenna further comprises:

sending, from the host processor to a switch, a first instruction to select the first antenna; and sending, from the host processor to the network processor, a second instruction to connect to the first wireless network using the first antenna.

5. A computer-implemented method comprising:

determining, using a first antenna, a first signal strength value associated with a first wireless network;

determining that the first signal strength value is below a first threshold value;

determining a first absolute difference between the first signal strength value and a reference value;

determining that the first absolute difference is above a second threshold value;

determining, using a second antenna, a second signal strength value associated with the first wireless network;

determining a second difference between the second signal strength value and the first signal strength value;

determining that the second difference is above a third threshold value;

incrementing a counter value;

determining, at a first time, that the counter value is above a fourth threshold value;

associating the second antenna with the first wireless network;

connecting, using the second antenna, to the first wireless network; and storing the second signal strength value as a second reference value.

6. The computer-implemented method of claim 5, further comprising:

determining, at a second time before the first time, that the counter value is below the fourth threshold value;

determining, using the first antenna, a third signal strength value associated with the first wireless network;

determining, using the second antenna, a fourth signal strength value associated with the first wireless network;

determining a third difference between the fourth signal strength value and the third signal strength value;

determining that the third difference is above the third threshold value; and incrementing the counter value.

7. The computer-implemented method of claim 5, further comprising:

performing, at a second time before the first time and using the first antenna, a first network scan;

performing a second network scan using a second antenna;

detecting the first wireless network during the first network scan and the second network scan;

determining, using the first antenna, a third signal strength value of the first wireless network;

determining, using the second antenna, a fourth signal strength value of the first wireless network;

determining that the third signal strength value is greater than the fourth signal strength value; and associating, at substantially the second time, the first antenna with the first wireless network.

8. The computer-implemented method of claim 5, further comprising:

performing, using the first antenna, a first network scan, the first network scan identifying a second wireless network;

performing a second network scan using the second antenna;

determining that the second wireless network is not detected during the second network scan; and associating the first antenna with the second wireless network.

9. The computer-implemented method of claim 5, further comprising:

displaying, at a second time before the first time, a list of available wireless networks including the first wireless network;

receiving a command to connect to the first wireless network;

determining that the first antenna is associated with the first wireless network;

connecting, using the first antenna, to the first wireless network;

determining, using the first antenna, a third signal strength value associated with the first wireless network; and storing the third signal strength value as the reference value.

10. The computer-implemented method of claim 5, further comprising:

receiving, by a host processor from a network processor, the second signal strength value;

determining, by the host processor, that the counter value is above the fourth threshold value;

associating, by the host processor, the second antenna with the first wireless network;

storing, by the host processor, the second signal strength value as the reference value;

sending, from the host processor to a switch, a first instruction to select the second antenna; and sending, from the host processor to the network processor, a second instruction to connect to the first wireless network.

11. The computer-implemented method of claim 5, wherein the determining the second signal strength value further comprises, while connected to the first wireless network via the first antenna:

sending, using the second antenna, a probe request to the first wireless network;

receiving, using the second antenna, a probe response from the first wireless network; and determining the second signal strength value based on the probe response.

12. The computer-implemented method of claim 5, the method further comprising:

associating the second antenna and a third antenna with the first wireless network; and connecting, using the second antenna and the third antenna, to the first wireless network.

13. A device, comprising:
at least one processor;
a memory device including instructions operable to be executed by the at least one processor to configure the device to:
  determine, using a first antenna, a first signal strength value associated with a first wireless network;
  determine that the first signal strength value is below a first threshold value;
  determine a first absolute difference between the first signal strength value and a reference value;
  determine that the first absolute difference is above a second threshold value;
  determine, using a second antenna, a second signal strength value associated with the first wireless network;
  determine a second difference between the second signal strength value and the first signal strength value;
  determine that the second difference is above a third threshold value;
  increment a counter value;
  determine, at a first time, that the counter value is above a fourth threshold value;
  associate the second antenna with the first wireless network;
  connect, using the second antenna, to the first wireless network; and
  store the second signal strength value as a second reference value.

14. The system of claim 13, wherein the instructions further configure the system to:
  determine, at a second time before the first time, that the counter value is below the fourth threshold value;
  determine, using the first antenna, a third signal strength value associated with the first wireless network;
  determine, using the second antenna, a fourth signal strength value associated with the first wireless network;
  determine a third difference between the fourth signal strength value and the third signal strength value;
  determine that the third difference is above the third threshold value; and
  increment the counter value.

15. The system of claim 13, wherein the instructions further configure the system to:
  perform, at a second time before the first time and using the first antenna, a first network scan;
  perform a second network scan using a second antenna;
  detect the first wireless network during the first network scan and the second network scan;
  determine, using the first antenna, a third signal strength value of the first wireless network;
  determine, using the second antenna, a fourth signal strength value of the first wireless network;
  determine that the third signal strength value is greater than the fourth signal strength value; and
  associate, at substantially the second time, the first antenna with the first wireless network.

16. The system of claim 13, wherein the instructions further configure the system to:
  perform, using the first antenna, a first network scan, the first network scan identifying a second wireless network;
  perform a second network scan using the second antenna;
  determine that the second wireless network is not detected during the second network scan; and
  associate the first antenna with the second wireless network.

17. The system of claim 13, wherein the instructions further configure the system to:
  display, at a second time before the first time, a list of available wireless networks including the first wireless network;
  receive a command to connect to the first wireless network;
  determine that the first antenna is associated with the first wireless network;
  connect, using the first antenna, to the first wireless network;
  determine, using the first antenna, a third signal strength value associated with the first wireless network; and
  store the third signal strength value as the reference value.

18. The system of claim 13, wherein the instructions further configure the system to:
  receive, by a host processor from a network processor, the second signal strength value;
  determine, by the host processor, that the counter value is above the fourth threshold value;
  associate, by the host processor, the second antenna with the first wireless network;
  store, by the host processor, the second signal strength value as the reference value;
  send, from the host processor to a switch, a first instruction to select the second antenna; and
  send, from the host processor to the network processor, a second instruction to connect to the first wireless network.

19. The system of claim 13, wherein the instructions further configure the system to, while connected to the first wireless network via the first antenna:
  send, using the second antenna, a probe request to the first wireless network;
  receive, using the second antenna, a probe response from the first wireless network; and
  determine the second signal strength value based on the probe response.

20. The system of claim 13, wherein the instructions further configure the system to:
  associate the second antenna and a third antenna with the first wireless network; and
  connect, using the second antenna and the third antenna, to the first wireless network.

* * * * *